Feb. 28, 1950     L. A. DE ROSA     2,498,659
AUTOMATIC VOLUME CONTROL SYSTEM
Filed Feb. 9, 1946     2 Sheets-Sheet 1
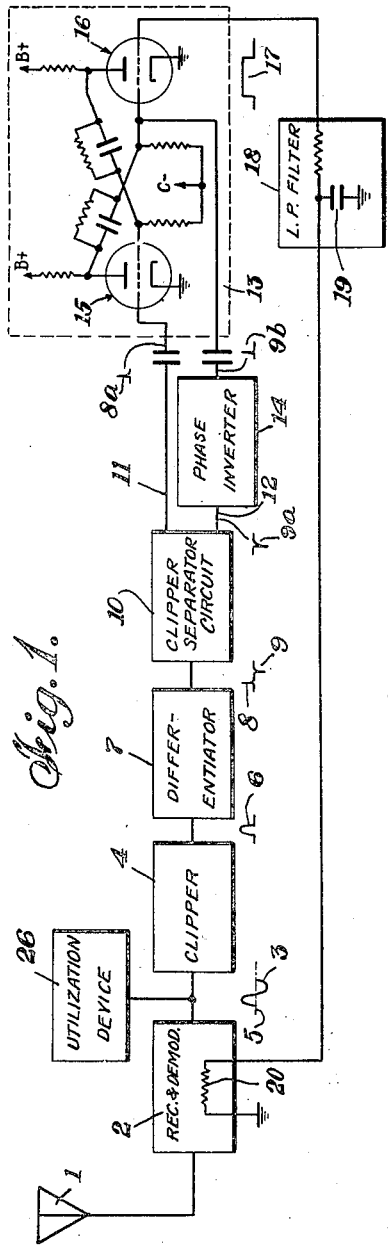
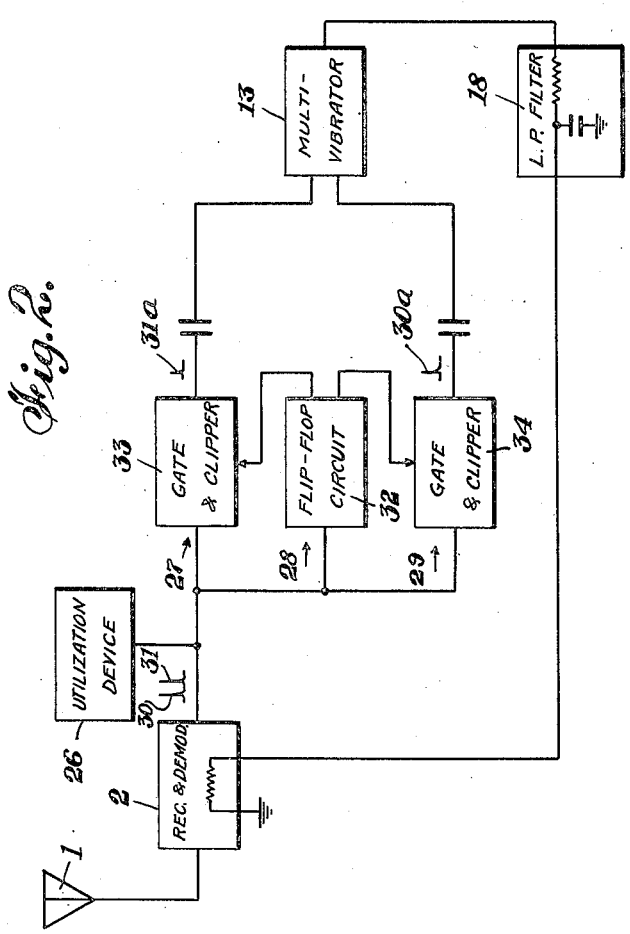
INVENTOR.
LOUIS A. DE ROSA
BY
R. P. Morris
ATTORNEY Feb. 28, 1950     L. A. DE ROSA     2,498,659
AUTOMATIC VOLUME CONTROL SYSTEM
Filed Feb. 9, 1946     2 Sheets-Sheet 2
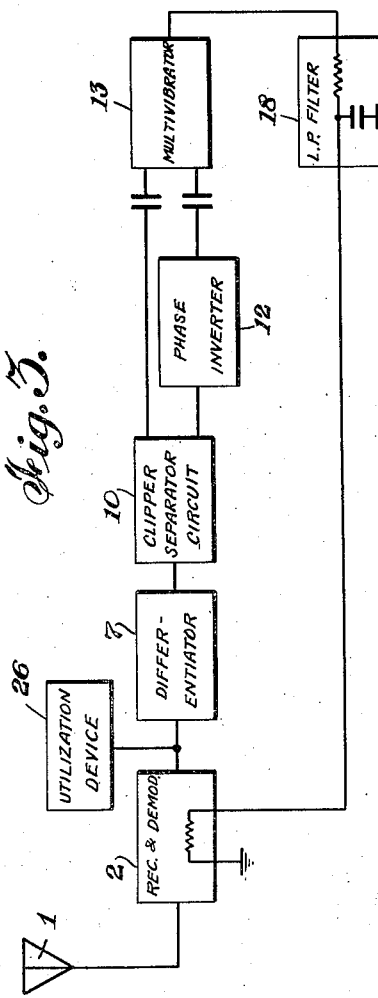
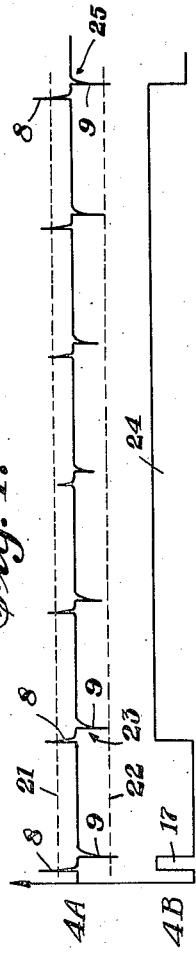
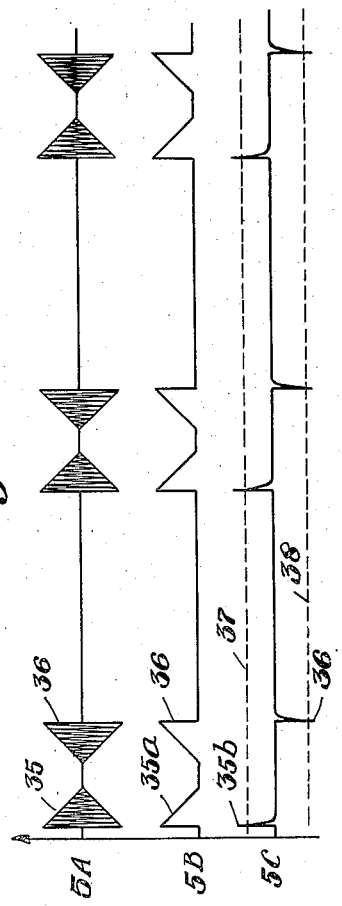
INVENTOR.
LOUIS A. DE ROSA
BY
*R. P. Morris*
ATTORNEY Patented Feb. 28, 1950

2,498,659

UNITED STATES PATENT OFFICE 2,498,659

AUTOMATIC VOLUME CONTROL SYSTEM

Louis A. de Rosa, Bloomfield, N. J., assignor to Federal Telephone and Radio Corporation, New York, N. Y., a corporation of Delaware Application February 9, 1946, Serial No. 646,694

7 Claims. (Cl. 250—20)

This invention relates to automatic volume control systems, particularly for use in connection with radio receivers.

It has been found that automatic volume control systems of conventional design do not operate satisfactorily with sharp pulses as for example, pulses used in pulse communication systems or in radar.

An object of the present invention is the provision of an improved automatic volume control system.

Another object of the invention is the provision of an improved volume control system which is particularly adapted for automatic volume control of pulse signals.

Another object of the present invention is the provision of an improved automatic volume control system which may be used for the control of sinusoidally modulated energy as well as for the control of energy in pulse form.

While my invention itself is defined in the appended claims, the invention, together with other and further objects and features thereof, will be best understood from the following description of embodiments thereof, reference being had to the drawings, in which:

Fig. 1 is a schematic and block diagram of a receiver including an automatic volume control system embodying the present invention;

Fig. 2 is a schematic and block diagram of a modification of the system illustrated in Fig. 1;

Fig. 3 is a schematic and block diagram of another modification of the system of Fig. 1, particularly adapted for the reception of pulses having asymmetrical leading and trailing edges; and Figs. 4 and 5 are sets of curves used in explaining the operation of the systems of Figs. 1 through 3.

In accordance with an important feature of the present invention I derive from the incoming signal (as for example from the output of the receiver) pairs of pulses whose amplitudes vary with the amplitude of the incoming signal and the gain of the receiver. These pairs of pulses are passed through a threshold device (such as a clipper) which normally permits the tips of these pulses to pass. These passed tips or passed pulses are applied to a multi-vibrator having two states or levels of stability. The first passed pulse of each pair trips the multivibrator from its first level to a second level, and the second passed pulse trips the multi-vibrator back again to its original or first level. The output of the multivibrator is under these conditions in the form of rectangular pulses. The total energy content of the rectangular pulses is used to control the gain of the receiver, as for example by applying said rectangular pulses to an integrating device which may include a condenser charged by said rectangular pulses, the resultant voltage across said condenser being applied to control the bias of selected tubes in the receiver to control the gain of the receiver.

Normally, that is whenever the amplitude of the output of the receiver is at or above a predetermined level, both pulses of each pair pass through the threshold device and trip the multi-vibrator from its first level to its second level and immediately back again to its original level. The resultant rectangular pulses thus produced have relatively small energy content so that the condenser at the output of the multi-vibrator is charged so slightly by each of said rectangular pulses that the voltage thereby produced across the condenser is negligible and the gain of the receiver is substantially unaffected. The condenser is arranged in a discharge circuit whose rate is such that the increment of charge on said condenser due to the successive rectangular pulses is preferably less than the amount of charge dissipated in the condenser discharge circuit.

When the amplitude of the output of the receiver falls below said predetermined value (due for example to fading of the signal) only one pulse (for example, the first pulse) of each pair passes through the threshold device while the second pulse is unable to do so. This may be accomplished by various means, such as for example having the level of the threshold device with respect to the first pulse of each pair lower than with respect to the second pulse of each pair so that when the amplitude of both pulses of each pair falls, said first pulse will still be able to pass over its relatively low threshold while said second pulse will not be able to pass over its relatively high threshold. Another way of accomplishing this is to change the relative amplitude of the said first and second pulses before they are transmitted to the threshold device. Whatever technique is used, when the signal fades, only the first pulse will pass through the threshold device. The first passed pulse of each pair trips the multi-vibrator from its first level of stability to its second level. Since there is no passed second pulse of each pair to trip the multi-vibrator back to its original state, it remains at the second level. Succeeding first passed pulses of each pair do not trip the multi-vibrator back to its first level due to the way in which they are fed to the multi-vibrator. Accordingly, the multi-vibrator continues to remain at its second level of stability and feeds a very long pulse (or D. C. energy for a long time), charging the condenser to progressively higher levels. As the charging of the condenser continues the voltage thereacross increases and this increasing voltage increases the gain of the receiver. The increasing gain of the receiver finally becomes so great that both pulses of each pair derived from the receiver have achieved sufficient amplitude to pass the threshold device. When the first of the second pulses of a pair passes the threshold device, it trips the multi-vibrator back to its first or original level. This temporarily halts the charging of the condenser and permits it to begin discharging through its discharge circuit. Since the rate of discharge is preferably somewhat greater than the rate at which the condenser is being charged by the relatively small rectangular pulses produced in the output of the multi-vibrator between a first and second passed pulse of a pair, the voltage across the condenser will slowly decrease, thereby causing the gain of the receiver to decrease until both pulses of the pairs can no longer pass the threshold device, whereupon the multi-vibrator is again tripped by only the first pulse and recharges the condenser to once more bring up the gain of the receiver. Thus, the automatic volume control system continues to "hunt" for a given amplitude level. The foregoing will perhaps be clearer from the following description.

Referring now to Fig. 1, an automatic volume control system embodying my invention is illustrated in combination with a receiver of the type adapted to receive energy modulated other than by pulses, as for example, sinusoidal modulated carrier waves. The arrangement there illustrated includes an antenna 1, on which the incoming energy is picked up, which leads to a receiver and demodulator 2, whose output is in substantially sinusoidal wave-form as indicated at 3. The output of receiver 2 is fed to a clipper 4, which clips each of wave-forms 3 at a level generally designated by the numeral 5 to produce pulses 6. The amplitudes of pulses 6 vary in accordance with the amplitude of the sinusoidal wave-forms 3. The pulses 6 are differentiated in a differentiator 7 to each produce two sharp pulses 8 and 9, 8 being positive and 9 being negative. The pair of pulses 8 and 9, which are derived from the output of receiver 2 are fed to a clipper separator 10 which is set at a predetermined level so that it will normally pass only the tip of pulse 9 and a little more of pulse 8. The clipper 10 also serves to separate pulses 8 and 9 so that the output of clipper 10 has two separate channels 11 and 12. For this purpose, the clipper 10 may be of any conventional type such as for example, a double diode clipper in which each of the diodes passes pulses of opposite polarity. Pulse 8 appears in the output of clipper 10 along channel 11 as a positive pulse 8a, which is greater in amplitude than negative pulse 9a appearing in channel 12 which is derived from pulse 9. The pulses derived from clipper 10 may be used to control a multi-vibrator 13 having two levels of stability. This may be an Eccles-Jordan type of multi-vibrator. While positive pulse 8a may be employed to trigger the multi-vibrator from its first level of stability to its second level of stability and negative pulse 9a be applied to the same point to trigger the multi-vibrator back to its original level of stability, it is preferred to apply these pulses to different points. Accordingly, it becomes desirable to invert pulse 9a and for this purpose, pulse 9a is fed through a phase inverter 14, which inverts pulse 9a to produce the pulse shown at 9b. Pulse 8a is applied to the grid of a tube 15 in multi-vibrator 13, while pulse 9b is applied to the grid of the second tube 16 in multi-vibrator 13. Thus pulse 8a trips the multi-vibrator 1 and pulse 9b trips it the second time back to its original state. The output of multi-vibrator 13 is therefor a rectangular wave form pulse such as illustrated at 17, which is applied to a suitable integrating device, which may be, for example, a low pass filter 18, including a condenser 19, which condenser 19 is charged by the rectangular pulses 17. The condenser 19 is connected to the receiver and discharges itself through a resistor 20 therein, which may be one or more of the grid resistors. The condenser 19 normally discharges through resistor or resistors 20 to ground at a rate which is somewhat greater than the rate at which increments of charge are applied to the condenser 19 due to rectangular pulses 17. That is, the foregoing is true under conditions when both pulses 8 and 9 pass through the clipper separator circuit 10.

Referring to Fig. 4, in which the pairs of pulses 8 and 9 appear, the lines 21 and 22 indicate the clipping levels of the clipper separator circuit 10 for pulses 8 and 9 respectively. The clipping level 21 is nearer the central axis than the clipping level 22. Thus, as the incoming signals fade and the pulses 8 and 9 diminish as shown at point 23, only the positive pulse 8 will pass the threshold while the negative pulse 9 at point 23 will not. Consequently, instead of having a small rectangular pulse 17 at the output of the multi-vibrator 13 as indicated in curve 4b, Fig. 4, the pulse 24 thus produced is of relatively long duration and charges up condenser 19 (Fig. 1) and causes the voltage thereacross to rise, this rising voltage being used to bias the tubes in the receiver demodulator 2 to increase the gain of said receiver so that gradually despite the fading of the signal the gain increases to the point where the signal at the output of the receiver and the pulses derived therefrom are again restored to an amplitude as indicated at point 25 at which the negative pulse 9 again will pass the threshold and trip the multi-vibrator 13 back to its first or original level.

The output of receiver and demodulator 2 in addition to being fed through the automatic volume control arrangement, may be also fed to any suitable utilization device 26, which may be, for example, a loud speaker, an indicator etc.

In Fig. 2, there is illustrated a system for use with signals that are in the form of pulses. These signals are picked up on antenna 1 and fed through receiver and demodulator 2, the output of receiver and demodulator 2 being then fed through three channels 27, 28 and 29. The pulse output of receiver 2, which may consist of a pulse train including pulses 30, 31 etc. is fed in channel 28 to a flip-flop circuit 32. The output of circuit 32 is fed to two gates 33 and 34 arranged in channels 27 and 29 respectively. The flip-flop circuit alternately renders gates 33 and 34 conductive and each succeeding pulse actuates the flip-flop circuit to reverse the conductivity of both circuits. For example, pulse 30 causes the flip-flop circuit to operate so as to render gate 33 conductive while the next pulse, which is pulse 31 operating on a flip-flop circuit 32, causes said circuit to render its gate 34 conductive while gate 33 becomes non-conductive. Accordingly, pulse 30 which actuates flip-flop circuit 32 will pass through the open gate 34 to produce in the output thereof pulse 30a. But said pulse 30, causes flip-flop circuit to close gate 34 and open gate 33, the succeeding pulse 31 will then pass through gate 33 to produce an output pulse 31a. Gates 33 and 34 may also each include a clipper, which clipper serves as a threshold device and normally allows the tips of pulses 30 and 31 to pass therethrough, as was described, for example, in connection with the clipper 10 of Fig. 1. The clipper of gate 34 may also be adjusted to a lower level than that of the clipper of gate 33 so that the output pulse 30a will be larger than the output 31a. The output of gates 33 and 34 is then fed to multi-vibrator 13 whose output is fed to the low pass filter 18, which is connected back to the resistor 20 and the receiver and demodulator 2. The mode of operation is similar to that described in connection with Fig. 1.

In certain systems, particular radar systems, pulses are received in pairs in which each pulse varies in amplitude oppositely, that is, if the first pulse of the pair starts with a large amplitude and diminishes to zero amplitude, the second pulse of the pair starts with a very low amplitude such as zero amplitude and increases to a large amplitude. This is illustrated in Fig. 5, 5a where the first pulse 35 of the pair of pulses including 35 and 36 starts with large amplitude and diminishes while the second pulse 36 starts with low amplitude and increases. These pulse pairs are repeated in the incoming wave train. In the output of the receiver and demodulator, the pulses 35 and 36 take the form shown in curve 5B as pulses 35a and 36a which are sawtooth pulses in which the leading edge of 35a and the trailing edge of 36a are steep. Referring now to Fig. 3, pulses 35a and 36a are fed to the differentiator 7 and differentiated to produce pulses 35b and 36b, illustrated in curve 5C, Fig. 5. In the clipper and separator circuit 10 of Fig. 3, pulses 35b and 36b are clipped at levels 37 and 38 respectively, level 37 being closer to the axis than level 38 so that the passed portion of pulse 35b is larger than the passed portion of pulse 36b. The output of clipper separator 10 is operated as described in Fig. 1 to control multi-vibrator 13 and through filter 18 control the gain of receiver 2.

While I have described the details of various systems embodying my invention, it will be apparent that numerous changes may be made in these details. For example the system of Fig. 1 may also be used for pulse transmission where the pulses are not too sharp in terms of the parameters of the differentiator. These pulses would be clipped and differentiated like the sinusoidal energy, and the differentiated output used to control the gain in the manner described in connection with Fig. 1. Furthermore, while I have shown numerous other details in particularity, it will be apparent that changes in these may likewise be made. For example, instead of feeding positive pulses to the separate grids of the tube of the multi-vibrator 13, the control of the multi-vibrator 13 may be effected by feeding a positive pulse to the grid of one tube and a negative pulse to the same grid of the same tube, thus causing the circuit to move between its two levels of stability. Numerous other changes will occur from the foregoing description to those versed in the art.

Accordingly, while I have described above the principles of my invention in connection with specific apparatus, and particular modifications thereof, it is to be clearly understood that this description is made only by way of example and not as a limitation on the scope of my invention.

I claim:

1. A radio received for the reception of sinusoidally modulated energy, and an automatic volume control system therefor comprising means for deriving from the output of said receiver a pair of pulses whose amplitudes vary in accordance with the amplitude of said output, a clipper separator circuit adapted to separate the pulses and pass them when said pulses are above a predetermined level, and to pass only the first pulse of said pair of pulses when the amplitude of said pulses falls below said predetermined level, a multi-vibrator responsive to the passed pulses and having two levels of stability, a low pass filter connected to the output of said multi-vibrator and adapted to produce an output control voltage, and means for applying said control voltage to said receiver for controlling the gain thereof.

2. A radio receiver and an automatic volume control system therefor comprising means for deriving from the output of the receiver a pair of pulses varying in amplitude in accordance with the variations of amplitude of the output of the receiver, means controlled by the reception of the first pulse of said pair of pulses for initiating the producing of a control voltage, means controlled by the second pulse of said pair of pulses having an amplitude above a given level, for terminating the producing of said control voltage, and means for applying said control voltage to said receiver to control the gain thereof.

3. A radio receiver for substantially sinusoidally modulated energy and an automatic volume control system therefor comprising means for deriving from the sinusoidal output of said receiver a rectangular wave-form whose amplitude varies in accordance with the amplitude of said sinusoidal output, a differentiator, means for applying said retangular wave-form to said differentiator to produce a pair of sharp pulses, a clipper circuit coupled to the output of said differentiator adapted to clip the pulses of said pair each at a different level, and a multi-vibrator coupled to the output of said clipper, said multi-vibrator having two levels of stability between which it is tripped by said pair of pulses when both pulses pass the clipper circuit, a low pass filter connected to the output of said multi-vibrator adapted to integrate the output therefrom, and means for applying the output of said low pass filter to said receiver to control the gain thereof.

4. A radio pulse receiver and an automatic volume control system therefor comprising means for separating the output pulses of said receiver, a multivibrator having two levels of stability, means for applying the separated pulses to control separately the two levels of said multi-vibrator, a low pass filter coupled to the output of said multi-vibrator for producing a control voltage determined by the length of time the multi-vibrator remains at one of its levels of stability, and means for applying said control voltage to the receiver to control the gain thereof.

5. A radio receiver for energy carrying saw-tooth modulation, and an automatic volume control system therefor comprising a differentiator coupled to the output of said receiver for producing sharp pulses at the steep edge of each of said saw-tooth pulses, means coupled to the output of said differentiator for producing a control voltage determined by the amplitude of said sharp pulses, and means for applying said control voltage to said receiver for controlling the gain thereof.

6. A system for producing a control voltage in response to deviations of signal potentials at the output of a source of such potentials from a given norm, comprising a device having a first and second level of stability, means coupled to the output of said device and responsive thereto when said device is at its second level of stability for producing a control voltage whose magnitude is dependent on the length of time during which said device is at its second level of stability, and means for tripping said device from its first level to its second level and back, comprising, means for deriving from said source of potentials pairs of pulses whose amplitudes vary in accordance with the deviation of said potentials from said norm, means effectively applying to said device both pulses of each pair when said signal potentials are at said norm and means effectively applying only the first pulse of each pair when said signal potentials deviate from said norm whereby a first applied pulse of a pair trips said device to its second level and a second applied pulse of a pair retrips said device back to its first level.

7. A system for producing a control voltage in response to deviations of signal potentials at the output of a source of such potentials from a norm, comprising a device having a first and second level of stability, means coupled to the output of said device and responsive thereto when said device is at its second level of stability for producing a control voltage whose magnitude is dependent on the length of time during which said device is at its second level of stability, and means for tripping said device from its first level to its second level and back, comprising, means for deriving from said source of potentials pairs of pulses whose amplitudes vary in accordance with the amplitude of said potentials, a threshold device having two separate threshold levels, one relatively low threshold level for the first pulse of each pair and one relatively high threshold level for the second pulse of each pair, and means for impressing the output of said threshold device on said first mentioned device.

LOUIS A. DE ROSA

REFERENCES CITED

The following references are of record in the file of this patent:

UNITED STATES PATENTS

| Number | Name | Date |
|---|---|---|
| 1,866,687 | Wheeler | July 12, 1932 |
| 1,931,660 | Kantter | Oct. 24, 1933 |
| 2,224,134 | Blumlein | Dec. 10, 1940 |
| 2,240,600 | Applegarth | May 6, 1941 |
| 2,412,111 | Wilson | Dec. 3, 1946 |
| 2,421,018 | De Rosa | May 27, 1947 |